United States Patent
Asai et al.

(10) Patent No.: US 11,325,703 B2
(45) Date of Patent: May 10, 2022

(54) CONTROL DEVICE, INFORMATION PROCESSING METHOD, AND TETHERING DEVICE

(71) Applicant: Panasonic Intellectual Property Management Co., Ltd., Osaka (JP)

(72) Inventors: Katsuhiko Asai, Nara (JP); Kazunobu Konishi, Osaka (JP); Stephen William John, Nara (JP); Kazuo Inoue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 428 days.

(21) Appl. No.: 16/460,413

(22) Filed: Jul. 2, 2019

(65) Prior Publication Data

US 2020/0010191 A1   Jan. 9, 2020

(30) Foreign Application Priority Data

Jul. 9, 2018   (JP) .............................. JP2018-129628

(51) Int. Cl.
*B64C 39/02* (2006.01)
*G08G 5/00* (2006.01)
*H04W 4/021* (2018.01)
*G05D 1/10* (2006.01)

(52) U.S. Cl.
CPC .......... *B64C 39/022* (2013.01); *B64C 39/024* (2013.01); *G05D 1/106* (2019.05); *G08G 5/006* (2013.01); *H04W 4/022* (2013.01); *B64C 2201/12* (2013.01); *B64C 2201/148* (2013.01)

(58) Field of Classification Search
CPC ... B64C 39/22; B64C 39/024; B64C 2201/12; B64C 2201/148; G05D 1/106; G08G 5/006; H04W 4/022
See application file for complete search history.

(56) References Cited

U.S. PATENT DOCUMENTS

| 9,214,022 | B1 * | 12/2015 | Hallamask | ................ B64F 3/02 |
| 10,384,777 | B1 * | 8/2019 | Welsh | ........................ B64F 3/02 |
| 2013/0233964 | A1 * | 9/2013 | Woodworth | ........... G05D 1/104 244/2 |

(Continued)

FOREIGN PATENT DOCUMENTS

| AU | 2017100932 A4 * | 8/2017 |
| JP | 2887597 | 4/1999 |

(Continued)

*Primary Examiner* — Calvin Cheung
(74) *Attorney, Agent, or Firm* — Wenderoth, Lind & Ponack L.L.P.

(57) ABSTRACT

A control device includes a processor which: obtains first region information indicating a first region; obtains first position information indicating the position of an unmanned aerial vehicle tethered to a tethering device using a tether; and controls the tethering device using the first region information and the first position information to cause the tether to have tension corresponding to a specified distance which is at least one of the shortest distance between a boundary of the first region and the position of the unmanned aerial vehicle and a distance included in a predetermined range from the shortest distance.

9 Claims, 6 Drawing Sheets

(56) References Cited

U.S. PATENT DOCUMENTS

| | | | |
|---|---|---|---|
| 2014/0231590 A1* | 8/2014 | Trowbridge | A63H 27/12 |
| | | | 244/175 |
| 2014/0360832 A1* | 12/2014 | Aldrich | B60L 9/08 |
| | | | 191/12.2 R |
| 2015/0254988 A1 | 9/2015 | Wang et al. | |
| 2016/0102654 A1* | 4/2016 | GilroySmith | F03D 80/70 |
| | | | 244/1 TD |
| 2016/0207626 A1* | 7/2016 | Bailey | B64C 31/06 |
| 2017/0259941 A1* | 9/2017 | Briggs, IV | G05D 1/0866 |
| 2018/0039286 A1* | 2/2018 | Tirpak | B64F 1/00 |
| 2018/0094619 A1* | 4/2018 | Sellers | D07B 1/145 |
| 2018/0251216 A1* | 9/2018 | Whitaker | B64C 39/024 |
| 2019/0270518 A1* | 9/2019 | Buyse | B64C 39/022 |

FOREIGN PATENT DOCUMENTS

| | | | | |
|---|---|---|---|---|
| JP | 2013-79034 | | 5/2013 | |
| JP | 2017-142850 | | 8/2017 | |
| JP | 2017-174442 | | 9/2017 | |
| JP | 6426643 | | 11/2018 | |
| KR | 101640362 B1 * | | 7/2016 | |
| KR | 101759195 B1 * | | 7/2017 | |
| WO | WO-2007141795 A1 * | | 12/2007 | B64C 39/022 |
| WO | WO-2016065625 A1 * | | 5/2016 | A01K 15/027 |
| WO | WO-2018023031 A2 * | | 2/2018 | B64F 3/02 |
| WO | WO-2018034578 A1 * | | 2/2018 | G05D 1/104 |

* cited by examiner

CONTROL DEVICE, INFORMATION PROCESSING METHOD, AND TETHERING DEVICE

CROSS REFERENCE TO RELATED APPLICATION

This application claims the benefit of priority of Japanese Patent Application Number 2018-129628 filed on Jul. 9, 2018, the entire content of which is hereby incorporated by reference.

BACKGROUND

1. Technical Field

The present disclosure relates to control devices, information processing methods, and tethering devices for unmanned aerial vehicles which are tethered using tethers.

2. Description of the Related Art

It is necessary to implement safety measures so that unmanned aerial vehicles (UAVs) such as drones and unmanned aircraft do not enter no-fly zones when flying over an event site to take photographs, for example. For example, Japanese Unexamined Patent Application Publication No. 2013-079034 discloses a technique for attaching a tether to an unmanned aerial vehicle and adjusting the length of the tether to restrict the range of flight for the unmanned aerial vehicle. With this, it is possible to implement a safety measure so that the unmanned aerial vehicle does not enter no-fly zones.

SUMMARY

However, when an unmanned aerial vehicle which is tethered using a tether such as that disclosed in Japanese Unexamined Patent Application Publication No. 2013-079034 described above flies away from a tethering device a distance substantially equal to the maximum length of the tether, if the unmanned aerial vehicle attempts to move further away from the tethering device, the tension of the tether may change abruptly, causing a strong impact on the unmanned aerial vehicle. Depending on circumstances, the unmanned aerial vehicle may fly out of control and crash into the ground.

In view of this, an object of the present disclosure is to provide a control device, etc., which are capable of improving the safety of an unmanned aerial vehicle by keeping the unmanned aerial vehicle from being impacted by a tether.

A control device according to an aspect of the present disclosure includes a processor which is configured to: obtain first region information indicating a first region; obtain first position information indicating a position of an unmanned aerial vehicle tethered to a tethering device using a tether; and control the tethering device using the first region information and the first position information to cause the tether to have tension corresponding to a specified distance which is at least one of a shortest distance between a boundary of the first region and the position of the unmanned aerial vehicle and a distance included in a predetermined range from the shortest distance.

Note that the aforementioned general or specific aspects may be implemented using a system, a device, a method, an integrated circuit, a computer program, or a non-transitory computer-readable recording medium such as a compact disc read-only memory (CD-ROM), or any combination of systems, devices, methods, integrated circuits, computer programs, or recording media.

With the control device, etc., according to an aspect of the present disclosure, it is possible to improve the safety of an unmanned aerial vehicle by reducing impact on the unmanned aerial vehicle that is caused by a tether.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Figure 1:
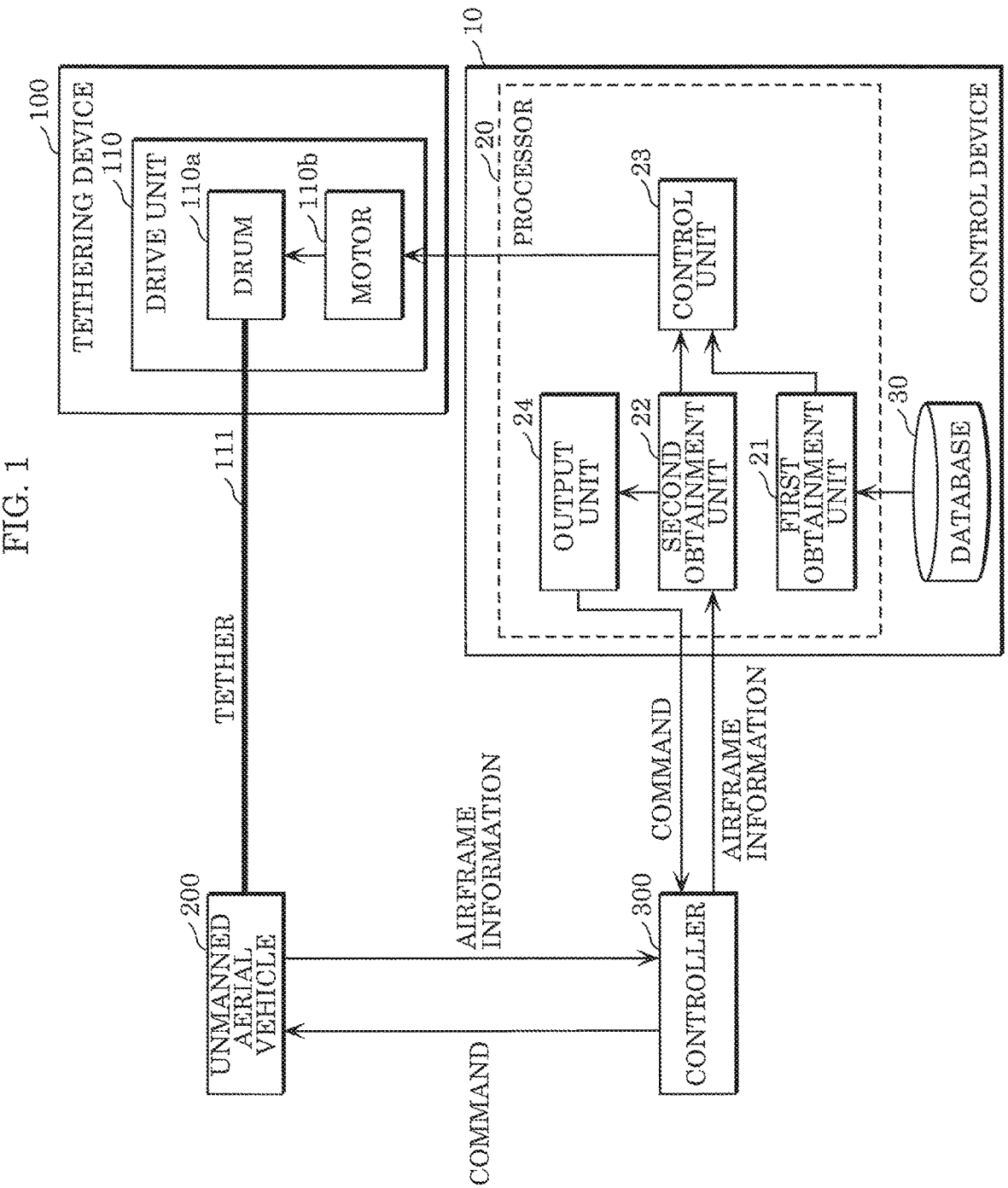
FIG. 1 is a diagram schematically illustrating the configuration of a control device, etc., according to an embodiment.

A control device according to an aspect of the present disclosure includes a processor which is configured to: obtain first region information indicating a first region; obtain first position information indicating a position of an unmanned aerial vehicle tethered to a tethering device using a tether; and control the tethering device using the first region information and the first position information to cause the tether to have tension corresponding to a specified distance which is at least one of a shortest distance between a boundary of the first region and the position of the unmanned aerial vehicle and a distance included in a predetermined range from the shortest distance.

For example, the maximum length of the tether is set equal to the distance between the tethering device and a nearby area of the boundary to keep an unmanned aerial vehicle from crossing the boundary of the first region (for example, the no-fly zone) into the first region. Therefore, when the distance between the tethering device and the unmanned aerial vehicle increases and becomes equal to the maximum length of the tether, the tether is suddenly stretched tight, and the tension of the tether momentarily increases. To deal with this, according to the present disclosure, since the tension of the tether can be adjusted according to the specified distance, for example, by gradually increasing the tension of the tether according to the specified distance, it is possible to keep the unmanned aerial vehicle from being strongly impacted by the tether due to a momentary increase in the tension of the tether. Thus, it is possible to keep the unmanned aerial vehicle from becoming out of control, enabling improvement in the safety of the unmanned aerial vehicle.

Furthermore, the processor may control the tethering device to increase the tension of the tether as the specified distance decreases.

With this, the tension of the tether gradually increases as the specified distance decreases, in other words, as the unmanned aerial vehicle becomes closer to the boundary, and thus it is possible to keep the unmanned aerial vehicle from being strongly impacted by the tether near the boundary (for example, near the no-fly zone). Thus, it is possible to keep the unmanned aerial vehicle from becoming out of control, for example, near the no-fly zone, enabling further improvement in the safety of the unmanned aerial vehicle.

Furthermore, the processor may control the tethering device to cause the tension of the tether to increase as the specified distance decreases when the specified distance is less than a first threshold value, and cause the tension of the tether to be constant when the specified distance is greater than or equal to the first threshold value.

With this, when the specified distance is greater than or equal to the first threshold value, the unmanned aerial vehicle is distant from the boundary, on the tethering device side thereof, and it is unlikely that the tether will be suddenly stretched tight; therefore, it is not necessary to gradually increase the tension of the tether as the specified distance decreases. Accordingly, the constant tension of the tether is set to such tension that the tethers does not become slack until the specified distance becomes less than the first threshold value, and thus the unmanned aerial vehicle can smoothly move without being significantly influenced by the tension of the tether while preventing slacking of the tether. Furthermore, when the specified distance is less than the first threshold value, it is possible to keep the unmanned aerial vehicle from being strongly impacted by the tether.

Furthermore, the processor may control the tethering device to cause the tension of the tether to be greater than a propulsive force of the unmanned aerial vehicle when the specified distance is less than a second threshold value.

With this, when the specified distance is less than the second threshold value (for example, the distance defined when the position of the unmanned aerial vehicle is in the vicinity of the boundary), the tension of the tether is greater than or equal to the propulsive force of the unmanned aerial vehicle, making it possible to keep the unmanned aerial vehicle from moving any closer to the boundary. Thus, it is possible to keep the unmanned aerial vehicle from crossing the boundary of the first region (for example, the no-fly zone) into the first region.

Furthermore, the processor may control the tethering device to cause the tension of the tether to smoothly change according to a change in the specified distance.

Thus, the tension of the tether smoothly changes according to a change in the specified distance, making it possible to inhibit a momentary tension increase during tension adjustment and therefore keep the unmanned aerial vehicle from being strongly impacted by the tether.

Furthermore, the processor may further output, to the unmanned aerial vehicle, a command to move toward the tethering device, using information that changes according to a temporal rate of change of the tension of the tether.

Even when the tension of the tether is adjusted according to the specified distance, there are cases where the unmanned aerial vehicle is strongly impacted by the tether if the unmanned aerial vehicle is moving at high speed toward the boundary and the temporal rate of change of the tension of the tether is high. In view of this, a command to move toward the tethering device, that is, in a direction in which the tension of the tether decreases, is output to the unmanned aerial vehicle, and thus it is possible to keep the unmanned aerial vehicle from being strongly impacted by the tether.

Furthermore, the information that changes according to the temporal rate of change of the tension of the tether may be at least one of a speed of travel of the unmanned aerial vehicle, a sensing result of a force sensor which detects the tension of the tether attached to the unmanned aerial vehicle, and driving information of a drive unit included in the tethering device and configured to adjust a length of the tether.

With use of such information, it is possible to determine whether or not the temporal rate of change of the tension of the tether is high.

An information processing method according to an aspect of the present disclosure includes the following steps performed using a processor: obtaining first region information indicating a first region; obtaining first position information indicating a position of an unmanned aerial vehicle tethered to a tethering device using a tether; and controlling the tethering device using the first region information and the first position information to cause the tether to have tension corresponding to a specified distance which is at least one of a shortest distance between a boundary of the first region and the position of the unmanned aerial vehicle and a distance included in a predetermined range from the shortest distance.

With this, it is possible to provide an information processing method which allows improvement of the safety of an unmanned aerial vehicle by keeping the unmanned aerial vehicle from being impacted by a tether.

A tethering device according to an aspect of the present disclosure includes: a tether which tethers an unmanned aerial vehicle; a drive unit configured to adjust a length of the tether; and a processor which is configured to: obtain first region information indicating a first region; obtain first position information indicating a position of the unmanned aerial vehicle tethered to the tethering device using the tether; and control the drive unit using the first region information and the first position information to cause the tether to have tension corresponding to a specified distance which is at least one of a shortest distance between a boundary of the first region and the position of the unmanned aerial vehicle and a distance included in a predetermined range from the shortest distance.

With this, it is possible to provide a tethering device capable of improving the safety of an unmanned aerial vehicle by keeping the unmanned aerial vehicle from being impacted by a tether.

Furthermore, the aforementioned general or specific aspects may be implemented using a system, a device, a method, an integrated circuit, a computer program, or a non-transitory computer-readable recording medium such as a CD-ROM, or any combination of systems, devices, methods, integrated circuits, computer programs, or recording media.

Hereinafter, an embodiment will be specifically described with reference to the drawings. The embodiment described below shows a general or specific example. The numerical values, shapes, materials, structural elements, the arrangement and connection of the structural elements, steps, the processing order of the steps etc. shown in the following embodiment are mere examples, and therefore do not limit the scope of the appended Claims. As such, among the structural elements in the following embodiment, structural elements not recited in any one of the independent claims which indicate the broadest concepts will be described as arbitrary structural elements.

Furthermore, the respective figures referred to in the following description are schematic diagrams and thus are not necessarily precise illustrations of the structural elements in terms of position, size, etc.

Embodiment

Hereinafter, an embodiment will be described with reference to FIG. 1 to FIG. 6.

[Configuration of Control Device, Etc.]

FIG. 1 is a diagram schematically illustrating the configuration of control device 10, etc., according to the embodiment. Note that FIG. 1 illustrates tethering device 100, unmanned aerial vehicle 200, and controller 300 in addition to control device 10.

Examples of unmanned aerial vehicle (UAV) 200 include flying machines such as drones and unmanned aircraft. By moving an unmanned aerial vehicle equipped with a camera, a microphone, and the like high up into the air, it is possible to capture an image, sound, and the like, at a site where human access is challenging. Unmanned aerial vehicle 200 is used, for example, at an event site. Unmanned aerial vehicle 200 includes, for example, a global positioning system (GPS) for obtaining information on the current position of unmanned aerial vehicle 200.

Controller 300 is a remote controller such as a digital proportional system for controlling (steering) unmanned aerial vehicle 200. Controller 300 is connected to unmanned aerial vehicle 200 in such a manner that allows wireless communication therebetween. Controller 300 transmits, to unmanned aerial vehicle 200, a command for moving (for example, moving upward, downward, forward, backward, leftward, and rightward, or turning) unmanned aerial vehicle 200. Unmanned aerial vehicle 200 transmits, to controller 300, airframe information including information on the position of unmanned aerial vehicle 200.

Tethering device 100 is for tethering unmanned aerial vehicle 200 and includes: tether 111 which tethers unmanned aerial vehicle 200; and drive unit 110 which adjusts the length of tether 111. In order to fulfill the need to tether unmanned aerial vehicle 200, tethering device 100 has a mass large enough not to be moved by the propulsive force of unmanned aerial vehicle 200. The length of tether 111 is variable and is adjusted using drive unit 110. Tethering device 100 is connected to control device 10 in such a manner that allows wireless communication therebetween.

Drive unit 110 includes, for example: drum (reel) 110a around which tether 111 is wound; and motor 110b which rotates drum 110a. As a result of motor 110b being driven according to an external command or the like, the direction and amount of rotation of drum 110a are controlled, and thus the length of tether 111 is adjusted. Adjusting the length of a linear object such as tether 111 using a motor and a drum is common practice that has traditionally been applied; thus, the details regarding adjustment of the length of tether 111 will be omitted.

Control device 10 is for improving the safety of unmanned aerial vehicle 200. Control device 10 is, for example, a personal computer (PC) or the like installed at an event site or the like. Control device 10 includes first obtainment unit 21, second obtainment unit 22, control unit 23, output unit 24, and database 30. Control device 10 includes, for example, processor 20 (which may be a microprocessor), a memory, a communication circuit, and the like. The communication circuit may include an antenna or the like. The memory is a read-only memory (ROM), a random-access memory (RAM), or the like and is capable of storing a control program that is executed by processor 20. Database 30 may be stored in this memory or may be stored in another memory. First obtainment unit 21, second obtainment unit 22, control unit 23, and output unit 24 are provided using, for example, a communication circuit and processor 20 which executes a control program stored in a memory in control device 10. First obtainment unit 21, second obtainment unit 22, control unit 23, output unit 24, and database 30 will be described with reference to FIG. 2.

[Operation of Control Device]

Figure 2:
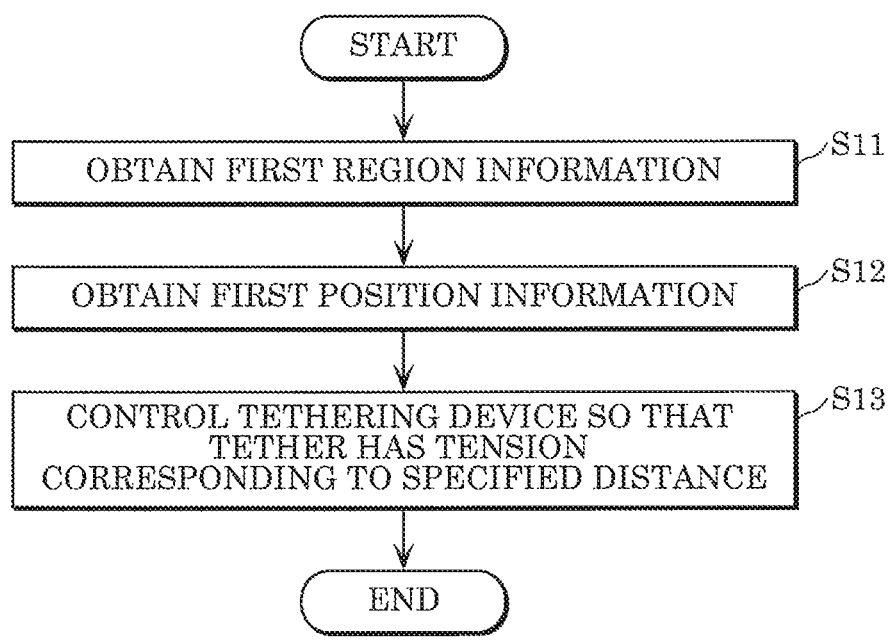
FIG. 2 is a flowchart illustrating an example of an operation of a control device according to an embodiment.

FIG. 2 is a flowchart illustrating an example of the operation of control device 10 according to the embodiment.

First obtainment unit 21 obtains first region information indicating a first region (Step S11). For example, the first region is a no-fly zone, and the first region information includes information on the position, range, boundary, or the like of the no-fly zone. Note that the first region may be a permissible flight zone, and the first region information may include information on the position, range, boundary, or the like of the permissible flight zone. This means that the first region may either be a no-fly zone or a permissible flight zone. In the present disclosure, it is sufficient that the boundary between the no-fly zone and the permissible flight zone be clear; this is because the boundary of the no-fly zone and the boundary of the permissible flight zone are the same. Note that the first region information is not required to include boundary information; it is sufficient that the first region information include information that can be used to calculate a boundary. In the present embodiment, the no-fly zone is set to the first region. The permissible flight zone is also referred to as the second region. The first region information is included in database 30 in advance, for example, and first obtainment unit 21 obtains the first region information from database 30. Note that the first region information may be stored in an external server or the like, and first obtainment unit 21 may obtain the first region information from the external server or the like.

Second obtainment unit 22 obtains first position information indicating the position of unmanned aerial vehicle 200 tethered to tethering device 100 using tether 111 (Step S12). For example, control device 10 is connected to controller 300 in such a manner that allows wireless communication therebetween. Second obtainment unit 22 obtains, via controller 300, airframe information including information on the position of unmanned aerial vehicle 200.

Note that control device 10 may be connected to unmanned aerial vehicle 200 in such a manner that allows wireless communication therebetween, and second obtainment unit 22 may obtain airframe information including information on the position of unmanned aerial vehicle 200 from unmanned aerial vehicle 200 without passing through controller 300. In other words, unmanned aerial vehicle 200 may transmit the airframe information to control device 10.

Control unit 23 controls tethering device 100 (drive unit 110) using the first region information and the first position information so that tether 111 has tension corresponding to a specified distance which is at least one of the shortest distance between the boundary of the first region and the position of the unmanned aerial vehicle and a distance included in a predetermined range from the shortest distance (Step S13). Thus, the specified distance is not required to be the shortest distance exactly and may be different from the shortest distance to some extent in the predetermined range. Details of the operation of control unit 23 will be described with reference to later-described FIG. 3 to FIG. 5.

Furthermore, although not illustrated in FIG. 2, output unit 24 outputs, to unmanned aerial vehicle 200, a command to move toward tethering device 100, using information that changes according to the temporal rate of change of the tension of tether 111. Details of the operation of output unit 24 will be described with reference to later-described FIG. 6.

[Details of Operation of Control Unit]

Next, details of the operation of control unit 23 will be described with reference to FIG. 3 to FIG. 5.

Figure 3:
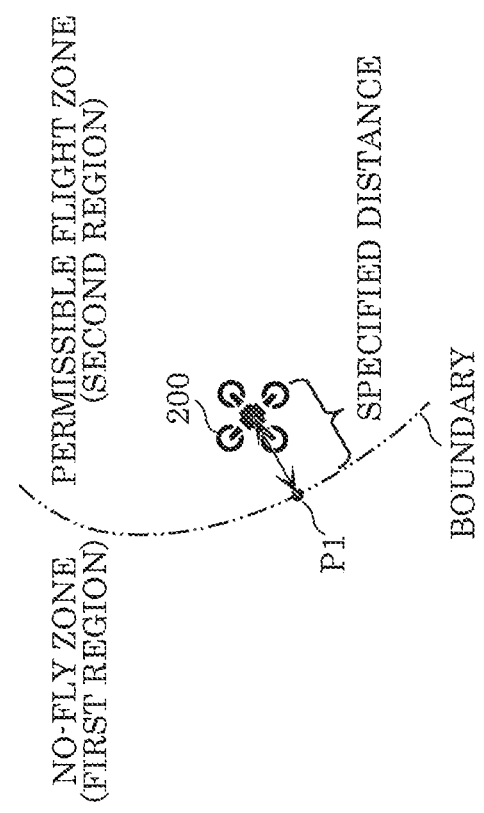
FIG. 3 is a diagram for describing a specified distance.

FIG. 3 is a diagram for describing the specified distance. FIG. 3 illustrates unmanned aerial vehicle 200 viewed from above in the air; for example, a boundary plane extends vertically on the drawing sheet.

The specified distance in the present disclosure is the shortest distance between the boundary of the first region and the position of unmanned aerial vehicle 200. Specifically, the specified distance is the distance between unmanned aerial vehicle 200 and a point located the shortest distance from unmanned aerial vehicle 200 among points on the boundary of the first region. Since the position of unmanned aerial vehicle 200 changes from moment to moment, the specified distance also changes from moment to moment according to the position of unmanned aerial vehicle 200. In FIG. 3, the point on the boundary of the first region that is located the shortest distance from the position of unmanned aerial vehicle 200 is denoted as P1. Since point P1 is in a position on the boundary that is closest to unmanned aerial vehicle 200, a tangent to the boundary at point P1 and a straight line connecting point P1 and unmanned aerial vehicle 200 intersect with each other at a right angle. As the specified distance decreases, unmanned aerial vehicle 200 becomes closer to the boundary. Control unit 23 calculates the specified distance using the information on the position of unmanned aerial vehicle 200, obtained by second obtainment unit 22, and the first region information obtained by first obtainment unit 21. Specifically, the specified distance is calculated based on the position of unmanned aerial vehicle 200 and the position of the boundary.

For example, the maximum length of tether 111 is set equal to the distance between tethering device 100 and a nearby area of the boundary to keep unmanned aerial vehicle 200 from crossing the boundary into the first region. Specifically, drum 110a with tether 111 wound thereon rotates freely to pay out tether 111 until the length of tether 111 reaches the maximum length, and when the length of tether 111 reaches the maximum length, stops rotating so that the length of tether 111 no longer increases. Therefore, when the distance between tethering device 100 and unmanned aerial vehicle 200 increases and becomes equal to the maximum length of tether 111, tether 111 is suddenly stretched tight, and the tension of tether 111 momentarily increases. Note that the event of tether 111 being suddenly stretched tight means a sharp increase in the tension of tether 111. At this time, there are cases where unmanned aerial vehicle 200 is strongly impacted; depending on circumstances, unmanned aerial vehicle 200 may fly out of control and crash into the ground.

Therefore, in order to keep unmanned aerial vehicle 200 from being strongly impacted by tether 111, control unit 23 controls drive unit 110 of tethering device 100 to adjust the tension of tether 111. Specifically, control unit 23 controls tethering device 100 so that tether 111 has tension corresponding to the specified distance between the boundary of the first region and the position of unmanned aerial vehicle 200. For example, the tension of tether 111 is set large to some extent according to the specified distance, in other words, unmanned aerial vehicle 200 is pulled to some extent via tether 111 before the distance between tethering device 100 and unmanned aerial vehicle 200 becomes equal to the maximum length of tether 111. This places unmanned aerial vehicle 200 in the state of being pulled by tether 111 in advance, and thus tether 111 is not suddenly stretched tight even when the distance between tethering device 100 and unmanned aerial vehicle 200 becomes equal to the maximum length of tether 111, meaning that the tension of tether 111 does not momentarily increase.

For example, control unit 23 causes motor 110b to generate a drive force in a direction in which tether 111 is taken up on drum 110a, enabling desired tension (tension corresponding to the specified distance) to be generated in tether 111. Specifically, control unit 23 calculates the current tension of tether 111 from the load torque of motor 110b and controls the drive voltage of motor 110b so that the calculated tension becomes equal to the tension corresponding to the specified distance, and thus it is possible to cause the tension corresponding to the specified distance to be generated in tether 111.

For example, control unit 23 controls tethering device 100 to cause the tension of tether 111 to increase as the specified distance decreases.

Specifically, control unit 23 controls tethering device 100 so that the tension of tether 111 increases as the specified distance decreases when the specified distance is less than the first threshold value, and the tension of tether 111 is constant when the specified distance is greater than or equal to the first threshold value. Furthermore, control unit 23 controls tethering device 100 so that the tension of tether 111 is greater than the propulsive force of unmanned aerial vehicle 200 when the specified distance is less than the second threshold value. This will be described with reference to FIG. 4 and FIG. 5.

Figure 4:
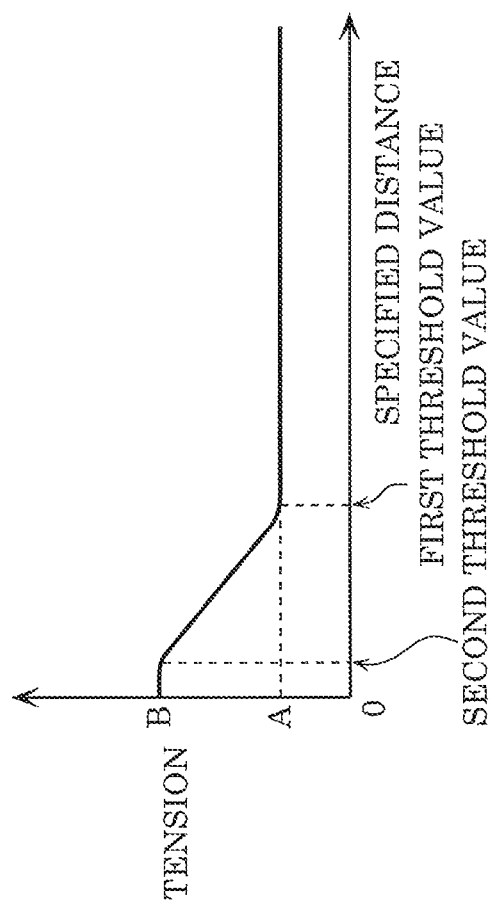
FIG. 4 is a diagram illustrating the relationship between a specified distance and the tension of a tether.

FIG. 4 is a diagram illustrating the relationship between the specified distance and the tension of tether 111. In FIG. 4, the horizontal axis represents the specified distance, and the vertical axis represents the tension of tether 111.

Figure 5:
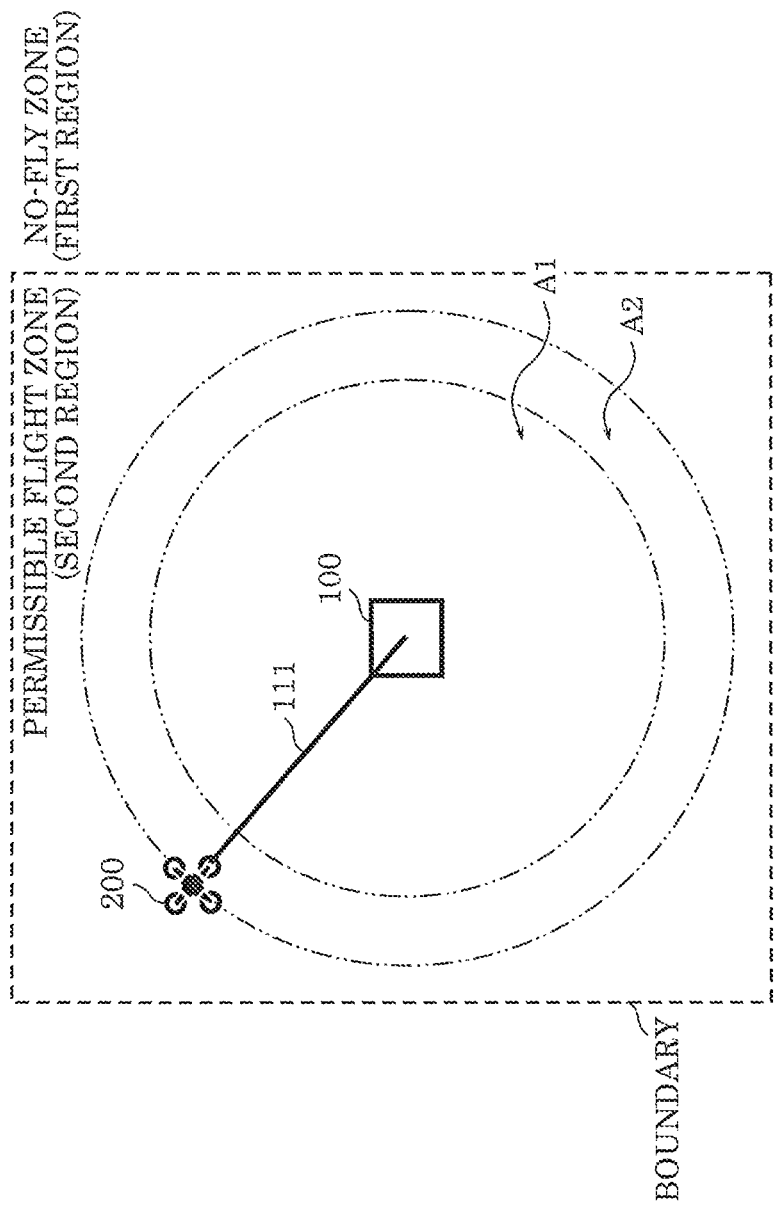
FIG. 5 is a diagram for describing the tension of a tether for each flight zone.

FIG. 5 is a diagram for describing the tension of tether 111 for each flight zone. FIG. 5 illustrates unmanned aerial vehicle 200 and tethering device 100 viewed from above in the air. The outside of the boundary (the square indicated by the dash line) is the first region, and the inside of the boundary is the second region. The boundary plane extends vertically on the drawing sheet, for example. The maximum length of tether 111 is set to half the length of a side of the square (the specified distance between tethering device 100 and the boundary).

As illustrated in FIG. 4, tether 111 has constant tension when the specified distance is greater than or equal to the first threshold value. Here, the constant tension is referred to as tension A. The first threshold value is the distance between the boundary and a point somewhat distant therefrom; when the specified distance is greater than or equal to the first threshold value, unmanned aerial vehicle 200 is somewhat distant from the boundary, on the tethering device 100 side thereof. Therefore, in this case, it is unlikely that tether 111 will be suddenly stretched tight; therefore, it is not necessary to gradually increase the tension of tether 111 as the specified distance decreases. Accordingly, tension A is set to such tension that tethers 111 does not become slack until the specified distance becomes less than the first threshold value, and thus unmanned aerial vehicle 200 can smoothly move without being significantly influenced by the tension of tether 111 while preventing slacking of tether 111. Region A1 (the inside of the inner circle among the two circles indicated by the two-dot dash lines) in FIG. 5 represents a region where the specified distance is greater than or equal to the first threshold value. Unmanned aerial vehicle 200 can smoothly move in region A1 without being significantly influenced by the tension of tether 111 while preventing slacking of tether 111.

Furthermore, as illustrated in FIG. 4, the tension of tether 111 increases as the specified distance decreases when the specified distance is less than the first threshold value. For example, control unit 23 controls tethering device 100 so that the tension of tether 111 smoothly changes according to a change in the specified distance. Smoothly changing of the tension of tether 111 according to a change in the specified distance means, for example, continuously changing of the tension. Note that when the tension has digital values, continuously changing of the tension includes minutely changing of the tension having digital values. Smoothly changing of the tension of tether 111 according to a change in the specified distance means, for example, that a function obtained by differentiating the tension with respect to the specified distance is continuous. In other words, the tension of tether 111 does not have discontinuous values according to a change in the specified distance. The change of tension between the first threshold value and the second threshold value is smooth in FIG. 4. Thus, the tension of tether 111 smoothly changes according to a change in the specified distance, making it possible to inhibit a momentary tension increase during adjustment. As just mentioned, the tension of tether 111 gradually increases as the specified distance decreases, in other words, as unmanned aerial vehicle 200 becomes closer to the boundary, and thus it is possible to keep unmanned aerial vehicle 200 from being strongly impacted by tether 111 near the boundary. Region A2 (the region between the inner circle and the outer circle among the two circles indicated by the two-dot dash lines) in FIG. 5 represents a region near the boundary where the specified distance is less than the first threshold value and is greater than or equal to the second threshold value; the tension of tether 111 is adjusted in region A2. Therefore, even when unmanned aerial vehicle 200 attempts to move toward the boundary with impetus that may be enough to cross the boundary, it is unlikely that tether 111 will be suddenly stretched tight, and thus it is possible to keep unmanned aerial vehicle 200 from being strongly impacted by tether 111.

Furthermore, as illustrated in FIG. 4, the tension of tether 111 is greater than the propulsive force of unmanned aerial vehicle 200 when the specified distance is less than the second threshold value. Here, tension greater than the propulsive force is referred to as tension B. The second threshold value is, for example, the distance defined when the position of unmanned aerial vehicle 200 is in the vicinity of the boundary, and when the specified distance is less than the second threshold value, unmanned aerial vehicle 200 is approaching the boundary. Therefore, in this case, it is necessary to keep unmanned aerial vehicle 200 from moving any closer to the first region. To deal with this, when the specified distance is less than the second threshold value, tension B is set greater than the propulsive force of unmanned aerial vehicle 200; as a result, tether 111 cannot be paid out from drum 110a with the propulsive force of unmanned aerial vehicle 200, making it possible to keep unmanned aerial vehicle 200 from moving any closer to the boundary. Thus, it is possible to keep unmanned aerial vehicle 200 from crossing the boundary of the first region into the first region. Unmanned aerial vehicle 200 outside region A2 illustrated in FIG. 5 can be kept from moving any closer to the boundary.

[Details of Operation of Output Unit]

Next, details of the operation of output unit 24 will be described.

For example, when unmanned aerial vehicle 200 is moving at high speed toward the boundary inside the second region, unmanned aerial vehicle 200 may move at high speed even in a region where the specified distance is less than the first threshold value and is greater than the second threshold value (region A2 illustrated in FIG. 5). At this time, the change of tension between the first threshold value and the second threshold value, illustrated in FIG. 4, occurs in a short period of time, and thus the tension of tether 111 may momentarily increase, resulting in unmanned aerial vehicle 200 being strongly impacted by tether 111. Furthermore, when there is a delay in the tension control due to the high-speed movement, the tension may overshoot with respect to a target value, which may also cause a momentary increase in the tension of tether 111, resulting in unmanned aerial vehicle 200 being strongly impacted by tether 111. In view of this, using information that changes according to the temporal rate of change of the tension of tether 111, output unit 24 outputs, to unmanned aerial vehicle 200, a command to move toward tethering device 100. This will be described with reference to FIG. 6.

Figure 6:
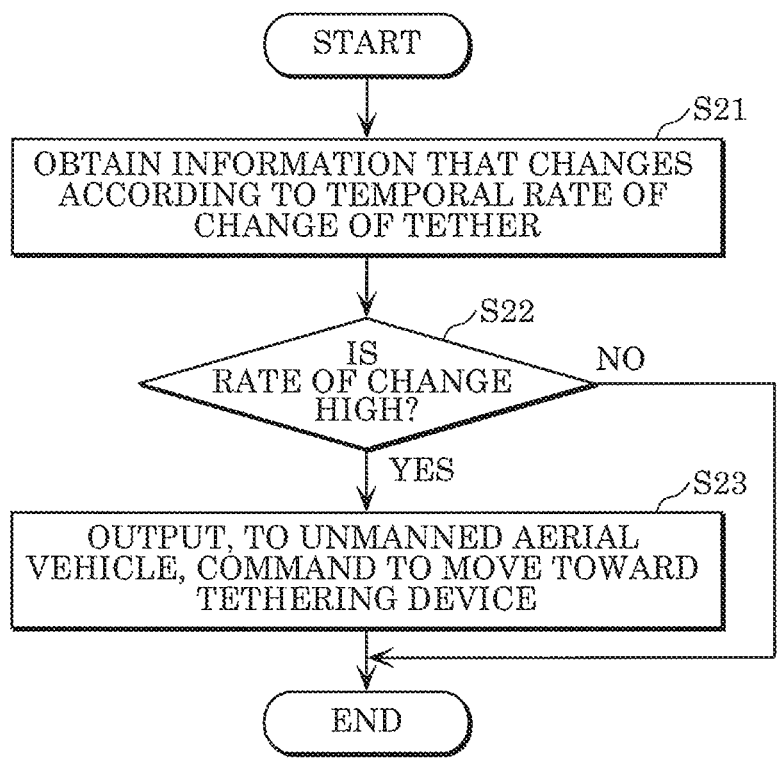
FIG. 6 is a flowchart illustrating an example of an operation of an output unit according to an embodiment.

FIG. 6 is a flowchart illustrating an example of the operation of output unit 24 according to the embodiment.

First, output unit 24 obtains information that changes according to the temporal rate of change of the tension of tether 111 (Step S21). The temporal rate of change of the tension of tether 111 increases as the speed of travel of unmanned aerial vehicle 200 increases; thus, the information that changes according to the temporal rate of change of the tension of tether 111 is, for example, the speed of travel of unmanned aerial vehicle 200. Specifically, the speed of travel is the speed of travel in a direction away from tethering device 100 (in a direction from tethering device 100 toward the boundary). Second obtainment unit 22 has obtained the information on the position of unmanned aerial vehicle 200, which is included in the airframe information of unmanned aerial vehicle 200, and therefore can calculate the speed of travel of unmanned aerial vehicle 200 using the information on the position of unmanned aerial vehicle 200 that changes from moment to moment. Note that unmanned aerial vehicle 200 or controller 300 may calculate the speed of travel of unmanned aerial vehicle 200 using the information on the position of unmanned aerial vehicle 200 and transmit the speed of travel to control device 10.

Next, output unit 24 determines, using the information that changes according to the temporal rate of change of the tension of tether 111, whether or not the rate of change is high (Step S22). When the speed of travel of unmanned aerial vehicle 200 is greater than or equal to a predetermined value, output unit 24 determines that the rate of change is high, and when the speed of travel of unmanned aerial vehicle 200 is less than the predetermined value, output unit 24 determines that the rate of change is low. The predetermined value is set, as appropriate, according to the level of resistance of unmanned aerial vehicle 200 to impact or the relationship between the specified distance and the tension of tether 111, for example.

When determining that the rate of change is high (YES in Step S22), output unit 24 outputs, to unmanned aerial vehicle 200, a command to move toward tethering device 100 (Step S23). For example, output unit 24 outputs the command to unmanned aerial vehicle 200 via controller 300. Controller 300 receives the command and adds up a current command (a command to move toward the boundary) and the received command (the command to move toward tethering device 100), for example. For example, when the current command that controller 300 is following is a command to move toward the boundary at a speed of 30 kilometers per hour and the command received by controller 300 from control device 10 is a command to move toward tethering device 100 at a speed of 20 kilometers per hour, controller 300 transmits, to unmanned aerial vehicle 200, a command to move toward the boundary at a speed of 10 kilometers per hour, which is the difference between the aforementioned speeds. This allows a reduction in the temporal rate of change of the tension of tether 111. Furthermore, although the speed of unmanned aerial vehicle 200 is reduced with respect to the current command, there is no change in the direction in which unmanned aerial vehicle 200 travels, and thus an operator for unmanned aerial vehicle 200 is less likely to feel that some fault has occurred in unmanned aerial vehicle 200. Note that unmanned aerial vehicle 200 may perform the operation of adding up these commands.

Note that when receiving a command from control device 10, controller 300 may overwrite a current command with the received command, and transmit the received command to unmanned aerial vehicle 200. For example, when the current command that controller 300 is following is a command to move toward the boundary at a speed of 30 kilometers per hour and the command received by controller 300 from control device 10 is a command to move toward tethering device 100 at a speed of 20 kilometers per hour, controller 300 may prioritize the received command and transmit, to unmanned aerial vehicle 200, the command to move toward tethering device 100 at a speed of 20 kilometers per hour. Note that both of these commands may be transmitted to unmanned aerial vehicle 200, and unmanned aerial vehicle 200 may prioritize the command from control device 10 among these commands and operate according to the command from control device 10.

For example, when unmanned aerial vehicle 200 operates differently from what is instructed in the operation of an operator for unmanned aerial vehicle 200, for example, moves in the opposite direction, the operator may feel that some fault has occurred in unmanned aerial vehicle 200. Therefore, control device 10 may include a presentation unit used to present, to the operator, information indicating that unmanned aerial vehicle 200 is being forcibly controlled.

The command from control device 10 is output to unmanned aerial vehicle 200 via controller 300, but may be output to unmanned aerial vehicle 200 directly, without passing through controller 300.

Even when the tension of tether 111 is adjusted according to the specified distance as described above, there are cases where unmanned aerial vehicle 200 is strongly impacted by tether 111 if unmanned aerial vehicle 200 is moving at high speed toward the boundary and the temporal rate of change of the tension of tether 111 is high. In view of this, a command to move toward tethering device 100, that is, in a direction in which the tension of tether 111 decreases, is output to unmanned aerial vehicle 200, and thus it is possible to keep unmanned aerial vehicle 200 from being strongly impacted by tether 111.

[Conclusion]

As described above, the tension of tether 111 can be adjusted according to the specified distance, and thus, for example, by gradually increasing the tension of tether 111 according to the specified distance, it is possible to keep unmanned aerial vehicle 200 from being strongly impacted by tether 111 due to a momentary increase in the tension of tether 111. Thus, it is possible to keep unmanned aerial vehicle 200 from becoming out of control, enabling improvement in the safety of unmanned aerial vehicle 200.

Other Embodiments

Although control device 10 according to the present disclosure has been described thus far based on the embodiment, the present disclosure is not limited to the above-described embodiment. Various modifications of the present embodiment as well as embodiments resulting from combinations of structural elements in different exemplary embodiments that may be conceived by a person having ordinary skill in the art are intended to be included within the scope of the present disclosure as long as these do not depart from the essence of the present disclosure.

For example, control device 10 is a PC or the like installed at an event site or the like in the above embodiment, but may be implemented as a server device or the like. Furthermore, the functional elements of control device 10 may spread across more than one server device.

Furthermore, for example, unmanned aerial vehicle 200 may include a force sensor which detects the tension of tether 111 attached to unmanned aerial vehicle 200. In this case, the information that changes according to the temporal rate of change of the tension of tether 111 may be the sensing result of the force sensor. This is because a change in the sensing result and a change in the tension of tether 111 correspond to each other. Furthermore, in this case, the direction in which unmanned aerial vehicle 200 approaches tethering device 100 may be the direction of the force indicated in the sensing result. Moreover, the sensing result may be included in the airframe information of unmanned aerial vehicle 200 and thus transmitted to control device 10. Since tethering device 100 and unmanned aerial vehicle 200 may be connected through a wired network using tether 111, the sensing result may be transmitted through wired communication to control device 10 via tethering device 100.

Furthermore, for example, processor 20 may obtain the load torque of motor 110b. In this case, the information that changes according to the temporal rate of change of the tension of tether 111 may be driving information (load torque) of drive unit 110 which is included in tethering device 100 and adjusts the length of tether 111. This is because a change in the load torque and a change in the tension of tether 111 correspond to each other.

As just described, the information that changes according to the temporal rate of change of the tension of tether 111 may be at least one of, for example, the speed of travel of unmanned aerial vehicle 200, the sensing result of the force sensor which detects the tension of tether 111 attached to unmanned aerial vehicle 200, and the driving information of drive unit 110 which is included in tethering device 100 and adjusts the length of tether 111.

Furthermore, for example, in the above embodiment, the first threshold value and the second threshold value are provided as threshold values for the specified distance, and control unit 23 performs control adapted for these threshold values, but this is not limiting. For example, it is sufficient that control unit 23 controls tethering device 100 to obtain tension corresponding to the specified distance; thus, control unit 23 is not required to perform control adapted for one or both of the first threshold value and the second threshold value.

Furthermore, for example, control device 10 includes output unit 24 in the above embodiment, but is not required to include output unit 24.

Furthermore, for example, the position of unmanned aerial vehicle 200 is obtained using the GPS in the above embodiment, but this is not limiting. For example, the position of unmanned aerial vehicle 200 with respect to tethering device 100 may be calculated using the length of tether 111 and the direction in which tether 111 extends. Furthermore, for example, the position of unmanned aerial vehicle 200 may be estimated by image recognition based on image capture by unmanned aerial vehicle 200. Various other known position measuring means may be used to obtain the position of unmanned aerial vehicle 200.

Furthermore, for example, in the above embodiment, the boundary between the first region and the second region extends vertically, but this is not limiting. For example, the boundary may extend horizontally. For example, when there is an altitude limit for the flight of unmanned aerial vehicle 200, there are cases where a horizontally extending boundary is set.

Furthermore, for example, tethering device 100 may include the functions of control device 10, and thus the present disclosure may be implemented as such tethering device 100. Specifically, tethering device 100 may include: tether 111 which tethers unmanned aerial vehicle 200; drive unit 110 which adjusts the length of tether 111; first obtainment unit 21 which obtains first region information indicating a first region; second obtainment unit 22 which obtains first position information indicating the position of unmanned aerial vehicle 200 tethered to tethering device 100 using tether 111; and control unit 23 which controls drive unit 110 using the first region information and the first position information to cause tether 111 to have tension corresponding to the specified distance between the boundary of the first region and the position of unmanned aerial vehicle 200.

Furthermore, the present disclosure can be implemented not only as control device 10 and tethering device 100, but also as an information processing method including steps (processes) which the structural elements included in control device 10 and tethering device 100 perform.

Specifically, as illustrated in FIG. 2, the information processing method including the following steps performed using processor 20: obtaining first region information indicating a first region (Step S11); obtaining first position information indicating the position of unmanned aerial vehicle 200 tethered to tethering device 100 using tether 111 (Step S12); and controlling tethering device 100 using the first region information and the first position information to cause tether 111 to have tension corresponding to a specified distance which is at least one of the shortest distance between a boundary of the first region and the position of unmanned aerial vehicle 200 and a distance included in a predetermined range from the shortest distance (Step S13).

Furthermore, for example, these steps may be performed by a computer (computer system). The present disclosure can be implemented as a program which causes the computer to perform the steps included in the method. Furthermore, the present disclosure can be implemented as a non-transitory, computer-readable recording medium such as a CD-ROM including the program recorded thereon.

For example, in the case where the present disclosure is implemented as a program (software), the steps are performed by executing the program using hardware resources such as a central processing unit (CPU), a memory, and an input/output circuit of the computer. Specifically, the steps are performed as a result of the CPU obtaining data from the memory, the input/output circuit, or the like, performing calculations, and outputting the calculation result to the memory, the input/output circuit, or the like.

Furthermore, each of the structural elements included in control device 10 and tethering device 100 according to the above embodiment may be implemented as a dedicated or general-purpose circuit. These structural elements may be implemented as a single circuit or may be implemented as two or more circuits.

Furthermore, the structural elements included in control device 10 and tethering device 100 according to the above embodiment may be implemented as large-scale integration (LSI) which is an integrated circuit (IC). These structural elements may be integrated into individual chips, or a portion or all of the structural elements may be integrated into one chip. Depending on the degree of integration, the LSI may also be referred to as system LSI, super LSI, or ultra LSI.

Moreover, the integrated circuit is not limited to the LSI and may be implemented as a dedicated circuit or a general-purpose processor. A field programmable gate array (FPGA) that can be programmed or a reconfigurable processor that allows reconfiguration of the connection or configuration of the inner circuit cells of the LSI can be used for the same purpose.

In addition, depending on the emergence of circuit integration technology that replaces LSI due to progress in semiconductor technology or other derivative technology, it is obvious that such technology may be used to configure the structural elements included in control device 10 and tethering device 100 as integrated circuits.

Forms obtained by various modifications to the exemplary embodiment that can be conceived by a person having ordinary skill in the art as well as forms realized by arbitrarily combining structural elements and functions in the exemplary embodiment which are within the scope of the essence of the present disclosure are included in the present disclosure.

INDUSTRIAL APPLICABILITY

The present disclosure is usable, for example, in a device for improving the safety of an unmanned aerial vehicle.

What is claimed is:

1. A control device, comprising a processor which is configured to:
   obtain first region information indicating a first region;
   obtain first position information indicating a position of an unmanned aerial vehicle tethered to a tethering device using a tether; and
   control the tethering device using the first region information and the first position information to cause the tether to have tension corresponding to a specified distance which is at least one of a shortest distance between a boundary of the first region and the position of the unmanned aerial vehicle and a distance included in a predetermined range from the shortest distance, wherein
   the processor controls the tethering device to increase the tension of the tether as the specified distance decreases.

2. The control device according to claim 1, wherein
   the processor controls the tethering device to cause the tension of the tether to increase as the specified distance decreases when the specified distance is less than a first threshold value, and cause the tension of the tether to be constant when the specified distance is greater than or equal to the first threshold value.

3. The control device according to claim 1, wherein the processor controls the tethering device to cause the tension of the tether to be greater than a propulsive force of the unmanned aerial vehicle when the specified distance is less than a second threshold value.

4. A The control device, comprising a processor which is configured to:
obtain first region information indicating a first region;
obtain first position information indicating a position of an unmanned aerial vehicle tethered to a tethering device using a tether; and
control the tethering device using the first region information and the first position information to cause the tether to have tension corresponding to a specified distance which is at least one of a shortest distance between a boundary of the first region and the position of the unmanned aerial vehicle and a distance included in a predetermined range from the shortest distance, wherein
the processor controls the tethering device to cause the tension of the tether to smoothly change according to a change in the specified distance.

5. A control device, comprising a processor which is configured to:
obtain first region information indicating a first region;
obtain first position information indicating a position of an unmanned aerial vehicle tethered to a tethering device using a tether; and
control the tethering device using the first region information and the first position information to cause the tether to have tension corresponding to a specified distance which is at least one of a shortest distance between a boundary of the first region and the position of the unmanned aerial vehicle and a distance included in a predetermined range from the shortest distance, wherein
the processor further outputs, to the unmanned aerial vehicle, a command to move toward the tethering device, using information that changes according to a temporal rate of change of the tension of the tether.

6. The control device according to claim 5, wherein the information that changes according to the temporal rate of change of the tension of the tether is at least one of a speed of travel of the unmanned aerial vehicle, a sensing result of a force sensor which detects the tension of the tether attached to the unmanned aerial vehicle, and driving information of a drive unit included in the tethering device and configured to adjust a length of the tether.

7. An information processing method, comprising the following steps performed using a processor:
obtaining first region information indicating a first region;
obtaining first position information indicating a position of an unmanned aerial vehicle tethered to a tethering device using a tether; and
controlling the tethering device using the first region information and the first position information to cause the tether to have tension corresponding to a specified distance which is at least one of a shortest distance between a boundary of the first region and the position of the unmanned aerial vehicle and a distance included in a predetermined range from the shortest distance, wherein
the tethering device is controlled to increase the tension of the tether as the specified distance decreases.

8. An information processing method, comprising the following steps performed using a processor:
obtaining first region information indicating a first region;
obtaining first position information indicating a position of an unmanned aerial vehicle tethered to a tethering device using a tether; and
controlling the tethering device using the first region information and the first position information to cause the tether to have tension corresponding to a specified distance which is at least one of a shortest distance between a boundary of the first region and the position of the unmanned aerial vehicle and a distance included in a predetermined range from the shortest distance, wherein
the tethering device is controlled to cause the tension of the tether to smoothly change according to a change in the specified distance.

9. An information processing method, comprising the following steps performed using a processor:
obtaining first region information indicating a first region;
obtaining first position information indicating a position of an unmanned aerial vehicle tethered to a tethering device using a tether; and
controlling the tethering device using the first region information and the first position information to cause the tether to have tension corresponding to a specified distance which is at least one of a shortest distance between a boundary of the first region and the position of the unmanned aerial vehicle and a distance included in a predetermined range from the shortest distance, wherein
a command to move toward the tethering device is output to the unmanned aerial vehicle, using information that changes according to a temporal rate of change of the tension of the tether.

* * * * *